United States Patent Office 3,129,214
Patented Apr. 14, 1964

3,129,214
METHOD FOR CRYSTALLIZING MONOSODIUM NOVOBIOCIN
William H. De Vries, Kalamazoo Township, Kalamazoo County, Mich., assignor to The Upjohn Company, Kalamazoo, Mich., a corporation of Delaware
No Drawing. Filed Oct. 26, 1961, Ser. No. 147,763
3 Claims. (Cl. 260—210)

This invention pertains to a chemical process for preparing monosodium novobiocin and for recovering the same in crystalline form. More particularly, the invention is directed to a process which comprises neutralizing novobiocin with a sodium base in proportions to produce monosodium novobiocin in a reaction medium of acetone and a minor amount of water in proportions to produce a homogeneous solution of monosodium novobiocin and then crystallizing monosodium novobiocin therefrom.

Novobiocin is a known antibiotic and its monosodium salt is a particularly efficacious and commercially useful form because it can be administrated orally. The antibiotic is active against streptocooci, pneumococci, and penicillin-resistant staphylococci; and it can be used alone or in combination with, for example, a sulfonamide (e.g., sulfadiazine), or another antibiotic (e.g., tetracycline) for control of bacterial infections of the skin, respiratory tract, genitourinary tract, blood stream, bones, connective tissue, and other tissues.

The object of this invention is, therefore, to provide an improved process for preparing monosodium novobiocin. A further object of the invention is to provide an improved process for preparing monosodium novobiocin, and for recovering it in substantially pure crystalline form. Other objects of this invention will be readily apparent to those skilled in the art.

In accordance with the process of this invention, it has now been found that monosodium novobiocin can be effectively produced by neutralizing novobiocin with a sodium base in proportions to give monosodium novobiocin in a reaction medium of acetone containing a minor amount of water, sufficient to keep the monosodium novobiocin thus produced completely in solution, and then crystallizing the monosodium novobiocin therefrom. Since monosodium novobiocin is soluble in acetone in proportion to the amount of water (it is essentially insoluble in pure acetone), highly concentrated solutions of monosodium novobiocin can be obtained for crystallization in accordance with the process. Since monosidum novobiocin is relatively insoluble in pure acetone, crystallization is effected from such highly concentrated solutions by reducing the concentration of water with added acetone so as to reduce the solubility of monosodium novobiocin in the medium, and finally adding an inert organic solvent in order to obtain maximum yields of the crystalline monosodium novobiocin.

Neutralization of novobiocin dispersed (dissolved or suspended) in acetone and water can be effected with sodium hydroxide or a sodium salt of an acid having a dissociation constant less than that of novobiocin. Suitable sodium salts include sodium carbonate, sodium bicarbonate, sodium acetate, sodium propionate, sodium butyrate, sodium 2-ethylhexoate, sodium methoxide, sodium ethoxide, and the like. In a preferred embodiment of the process of the invention one equivalent of sodium hydroxide is used to neutralize the novobiocin.

The neutralizing reagent is added to a solution or suspension of novobiocin in acetone containing water. In general, best results in the crystallization step are obtained when the acetone contains from about 2% to about 25% water during the neutralization step. If too high a concentration of water is used, the quantity of acetone that must be added in order to effect crystallization and efficient recovery become unwieldy. Illustratively, the novobiocin can be dissolved or suspended in a reaction medium consisting of 96% acetone and 4% water, and an aqueous sodium hydroxide solution (1 N to 19 N, preferably 6 N to 12 N) is added; the final concentration of water can be 5% to 25% depending upon the normality of the base. On the other hand, an excess of anhydrous sodium carbonate or sodium bicarbonate can be added, in which case it is desirable to use a reaction medium containing from about 15% to about 25% water.

In general, neutralization is carried out at a temperature between about −10° C. and about 70° C. When neutralization is effected with sodium hydroxide, temperatures ranging from about 0° C. to about +10° C. are preferred in order to avoid localized heating of the reaction mixture and alkaline degradation of the novobiocin. When a sodium salt such as sodium carbonate or sodium bicarbonate is used, temperatures ranging from about 30° C. to about 60° C. are preferred.

After neutralization is completed and the monosodium novobiocin is in solution, the reaction mixture is diluted with additional acetone so as to reduce the concentration of water and produce supersaturated solutions of monosodium novobiocin for crystallization. The additional volume of medium also prevents setting up of the monosodium novobiocin crystals into a semisolid cake.

Crystallization can be carried out at temperatures in the range of 0° to 60° C. preferably between about 10° and about 50° C. Final crystallization is carried out at the lower temperatures in order to obtain maximum yield. While crystallization proceeds, additional acetone is added to the mixture until the concentration of water is reduced to less than about 1.5%. When this concentration of water has been reached, about ½ volume of an inert organic solvent, illustratively, technical hexane (Skellysolve B, essentially a mixture of isomeric hexanes having a boiling range of 140° to 160° Fahrenheit), ethyl acetate and the like, is added in order to obtain substantially complete crystallization of the monosodium novobiocin.

When crystallization is completed, the crystalline monosodium novobiocin is recovered by conventional methods; e.g., by filtration or centrifugation. The crystals are further purified by washing and drying.

The following examples are illustrative of the process and products of the present invention, but they are not to be construed as limiting.

*Example 1*

Ten kg. (15.9 moles) of crystalline novobiocin was suspended in a reaction medium consisting of 12.5 l. of acetone and 0.5 l. of deionized water. The suspension was cooled to about 0° C., and 1922 ml. of 8.23 N sodium hydroxide was slowly added with vigorous stirring. During the addition, the temperature of the reaction mixture was kept below 10° C., and stirring was continued vigorously for 5 minutes. Thirty l. of acetone was added and after thorough stirring the mixture was filtered. The filter cake was washed with 2.5 l. of 96% acetone and water (v.:v.), and the combined wash solution and filtrate was warmed to 20° C. There was added 21 l. of acetone and the mixture was heated to 46° C. The mixture was seeded with 1 g. of monosodium novobiocin, and it was stirred until crystallization was well under way (about 45 min.). Then 37.5 l. of acetone was added and the mixture was again heated to 46° C. Crystallization was allowed to proceed for about 1½ hours., and 67.5 l. of Skellysolve B at 46° C. was added. After stirring for 30 min., the slurry was filtered. The crystals were washed with 15 l. of a solution consisting of 9 l. of acetone and 6 l. of Skellysolve B. The crystals were then washed with 15 l. of Skellysolve B and dried in a vacuum over at 48° C. and 0.2 to 0.3 mm. of mercury pressure for 28 hours.

There was thus obtained 10,070 g. of monosodium novobiocin having an activity of 837 mcg./mg. when assayed with *S. lutea*.

*Example 2*

Eighteen kg. (28.6 moles) of novobiocin was suspended in 22.5 l. of acetone and heated to 45° C. There was then added, with stirring 3600 g. of sodium bicarbonate suspended in 7.2 l. of water. The reaction mixture was held at 46° to 48° C. for 45 min., and 5 l. of acetone was added. Stirring was continued for another 20 min. after which time neutralization was complete (total time of neutralization was about 80 min.). Acetone in the amount of 23 l. was then added, and after mixing for 10 min. at 46° C. the suspension was filtered to remove crystals of sodium bicarbonate. The filter was washed with a solution of acetone (810 ml.) and water (90 ml.). The filtrate and wash solution were combined, and dilute with 63 l. of acetone. This solution was heated to 48° C. and seeded with 18 g. of monosodium novobiocin. Crystallization began immediately and within 5 min. the slurry was viscous enough to require addition or more acetone. An additional 180 l. of acetone at 48° C. was added, and stirring was continued for 15 min. The slurry became very viscous and almost set up to a solid cake, but acetone was added to a total volume of 376 l., and after reheating to 49° C. fluidity was restored. The temperature was then held at 48° C. for 1¼ hrs. after which 160 l. of technical hexene (Skellysolve B) was added; the slurry was cooled to 30° C. and filtered. The filter cake was washed with 32 l. of acetone and the crystals of monosodium novobiocin were dried at 110° C. for 24 hrs. at 0.3 mm. of mercury pressure. There was thus obtained about 17 kg. of monosodium novobiocin assaying 855 mcgs./mg. using *S. lutea*.

*Example 3*

A 20 g. sample (0.031 mole) of novobiocin was dissolved in 25 ml. of acetone, and 4 g. of sodium bicarbonate suspended in 8 ml. of water was added. The reaction mixture was heated to 60° C. and stirred for 45 min. Thirty-one ml. of acetone was then added, and the mixture was filtered. The filter was washed with 2 ml. of 90% acetone. The filtrate and wash solution were combined and diluted with 150 ml. of acetone. After seeding, crystallization was allowed to proceed at about 40° C. and a further 375 ml. of acetone was added. There was then added 200 ml. of ethyl acetate, and after stirring for 15 min., 12.2 g. of monosodium novobiocin was recovered by filtration.

*Example 4*

A 20 g. sample (0.031 mole) of novobiocin was dissolved in 25 ml. of acetone, and 4 g. of sodium bicarbonate suspended in 8 ml. of water was added. The reaction mixture was heated to 40° C. for 2 hours., and 31 ml. of acetone was added. The mixture was filtered, and the filter cake was washed with 2 ml. of 90% acetone. The filtrate and wash solution were combined and diluted with 150 ml. of acetone. After seeding, crystallization was allowed to proceed at 40° C. for 2 hrs. A further 375 ml. of acetone was added and crystallization was continued for 1 hr. There was then added 250 ml. of technical hexane (Skellysolve B), and the slurry was stirred for 30 min. The suspension of crystals was filtered and the crystals were washed first with 50 ml. of acetone and then with 25 ml. of acetone. There was thus obtained 15 g. of monosodium novobiocin assaying 818 mcg./mg. using *S. lutea* and 933 mcg./mg. by U.V.

I claim:

1. The process for preparing crystalline monosodium novobiocin which comprises neutralizing novobiocin dispersed in acetone containing from about 2% to about 25% water to produce monosodium novobiocin, crystallizing the thus-produced monosodium novobiocin by decreasing the concentration of water to about 1.5% by adding acetone, adding about ½ volume of an insert organic diluent, and recovering crystalline monosodium novobiocin.

2. The proces for preparing crystalline monosodium novobiocin which comprises neutralizing novobiocin dispersed in a reaction medium consisting of acetone and from about 2% to about 25% water with one equivalent of sodium hydroxide at a temperature of about −10° C. to +10° C., crystallizing the thus-produced monosodium novobiocin by adding acetone until the water concentration is less than about 1.5%, and then adding about ½ volume of an inert hydrocarbon dilent, and recovering the monosodium novobiocin in crystalline form.

3. The process for preparing crystalline monosodium novobiocin which comprises neutralizing novobiocin dispersed in a reaction medium consisting of acetone and about 15% water, with one equivalent of sodium hydroxide at a temperature of about 0° C. to 10° C., and crystallizing the thus-produced monosodium novobiocin by adding acetone until the water concentration is less than about 1% and then adding about ½ volume of technical hexane and recovering the monosodium novobiocin in crystalline form.

References Cited in the file of this patent

UNITED STATES PATENTS

| | | |
|---|---|---|
| 2,983,723 | Caron et al. | May 9, 1961 |
| 3,049,534 | Wallick | Aug. 14, 1962 |